(12) United States Patent
Young

(10) Patent No.: US 8,723,426 B2
(45) Date of Patent: May 13, 2014

(54) SYSTEMS AND METHODS FOR SAMPLING LIGHT PRODUCED FROM AN LED ARRAY

(75) Inventor: Garrett J. Young, Sully, IA (US)

(73) Assignee: Prism Projection, Inc., Sully, IA (US)

( * ) Notice: Subject to any disclaimer, the term of this patent is extended or adjusted under 35 U.S.C. 154(b) by 340 days.

(21) Appl. No.: 13/183,120

(22) Filed: Jul. 14, 2011

(65) Prior Publication Data

US 2012/0013255 A1 Jan. 19, 2012

Related U.S. Application Data

(60) Provisional application No. 61/364,600, filed on Jul. 15, 2010.

(51) Int. Cl.
*H05B 37/02* (2006.01)

(52) U.S. Cl.
USPC ........... 315/149; 315/158; 315/307; 315/312; 362/558; 362/555; 362/545; 362/516

(58) Field of Classification Search
CPC ........... H05B 33/0851; H05B 33/0833; H05B 33/0845; G01J 3/0205
USPC ......... 315/117, 158, 294, 297, 307, 312, 318, 315/149; 362/297, 301, 330, 337, 511, 516, 362/544, 545, 555; 345/84, 88, 204, 690; 353/84
See application file for complete search history.

(56) References Cited

U.S. PATENT DOCUMENTS

| | | | |
|---|---|---|---|
| 7,547,124 B2 * | 6/2009 | Chang et al. | 362/373 |
| 7,859,554 B2 | 12/2010 | Young | |
| 7,942,556 B2 * | 5/2011 | Harbers et al. | 362/294 |
| 8,436,554 B2 * | 5/2013 | Zhao et al. | 315/294 |
| 8,444,275 B2 * | 5/2013 | Kurtz et al. | 353/85 |
| 8,469,575 B2 * | 6/2013 | Weber et al. | 362/609 |
| 2011/0012512 A1 * | 1/2011 | Young et al. | 315/117 |

* cited by examiner

*Primary Examiner* — Haiss Philogene

(74) *Attorney, Agent, or Firm* — Schwegman, Lundberg & Woessner, P.A.

(57) ABSTRACT

A system may include an LED array, an optical plane, optics, a sensor and a controller. The LED array is configured to generate LED light. The optical plane has a plurality of scattering features and with a mixing chamber. The optics is configured to direct the LED light to the optical plane. The plurality of scattering features are configured to reflect a sampled portion of the LED light into the mixing chamber. The mixing chamber is configured to mix the sampled portion of the LED light. The sensor is configured to sense the sampled portion of the LED light received from the mixing chamber. The controller is connected to the sensor and configured to control the LED array using the sensed, sampled portion of the LED light received from the mixing chamber.

20 Claims, 4 Drawing Sheets

SYSTEMS AND METHODS FOR SAMPLING LIGHT PRODUCED FROM AN LED ARRAY

CLAIM OF PRIORITY

This application claims the benefit of U.S. Provisional Application No. 61/364,600, filed on Jul. 15, 2010, under 35 U.S.C. §119(e), which is hereby incorporated by reference in its entirety.

TECHNICAL FIELD

This application relates generally to illumination and display devices, and more particularly to systems and methods for sampling light produced from an LED array.

BACKGROUND

Semiconductor based light sources, such as light emitting diodes (LEDs), have long life and high luminous efficiency, but vary in several respects, including color, intensity, and aging. Different colors of LEDs will not have equal intensities and will age differently. Even two LEDs of the same color, processed in the same manufacturing batch, can vary slightly in all of these respects. When combining multiple source colors of light to create a target color, it is necessary to be able to accurately to determine the chromaticity of each source color and the intensity of the source colors relative to each other. The less accurate the chromaticity and intensity measurements of the source colors, the less accurately the target color will be produced. This inaccuracy can cause two LED light sources that are both set to the same target color to have different appearances.

The LEDs of each light source can be measured with a spectrometer to determine the exact chromaticity and intensity. Target colors will then be reproduced accurately at the temperature that the LEDs were measured at. As the temperature increases LED output intensity is reduced and the wavelength may shift. The same changes take place permanently over thousands of hours of usage. Since one of the selling features of many LED light sources is the long life, it would seem important to maintain accuracy in produce target colors over that lifetime.

The inherent variations between LEDs, along with the need for precise color and intensity of light output over time, necessitate a mechanism to account for and control these differences. Current methods measure temperature or current density over time and attempt to mathematically predict the adjustments necessary to produce consistent light output. For example, a small subset of LEDs may be measured, and algorithms are used to estimate the LED characteristics for the rest of the LED array. These methods, however, are only approximations and fall far short of the goal of consistent, high-quality color output. Each LED in the array may be measured separately, but this is difficult for a large array of LEDs. Even so, points between known temperature data points or known current density points are still extrapolated.

SUMMARY

According to an embodiment of a method, light is produced from an LED array, wherein the LED array includes a plurality of LEDs. The light is directed from the LED array to an optical plate. Some of the light passes through the optical plate. A portion of the light from the LED array is sampled by reflecting the sampled portion of the light into a mixing chamber, and mixing the light within the mixing chamber. The mixed, sampled portion of the light is sensed.

A system embodiment comprises and LED array, an optical plane, optics, a sensor and a controller. The LED array is configured to generate LED light. The optical plane has a plurality of scattering features and with a mixing chamber. The optics is configured to direct the LED light to the optical plane. The plurality of scattering features are configured to reflect a sampled portion of the LED light into the mixing chamber. The mixing chamber is configured to mix the sampled portion of the LED light. The sensor is configured to sense the sampled portion of the LED light received from the mixing chamber. The controller is connected to the sensor and configured to control the LED array using the sensed, sampled portion of the LED light received from the mixing chamber.

A system embodiment comprises and LED array, an optical plane, optics, a sensor and a controller. The LED array is configured to generate LED light. The optical plane has a plurality of scattering features and with a mixing chamber. The optics is configured to direct the LED light to the optical plane. The plurality of scattering features are configured to reflect a sampled portion of the LED light into the mixing chamber. The mixing chamber is configured to mix the sampled portion of the LED light. The sensor is configured to sense the sampled portion of the LED light received from the mixing chamber. The controller is connected to the sensor and configured to control the LED array using the sensed, sampled portion of the LED light received from the mixing chamber. The controller includes a color module, an LED control module, and a color sensor module. The color module is configured to receive data and convert the received data into a color space and determine an appropriate solution for producing a desired color using the LED array. The LED control module is configured to use the solution from the color module to control the plurality of LEDs in the LED array to produce the desired color. The color sensor module is configured to measure chromaticity and intensity of the LED light, apply a sensor correction to measurements to create new measurements, and send the new measurements to the color module for use in determining subsequent solutions.

This Summary is an overview of some of the teachings of the present application and not intended to be an exclusive or exhaustive treatment of the present subject matter. Further details about the present subject matter are found in this application. Other aspects will be apparent to persons skilled in the art upon reading and understanding this application and viewing the drawings that form a part thereof, each of which are not to be taken in a limiting sense.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment.

The present subject matter provides an improved way to account for LED variability, rather than measuring temperature or current density over time for each LED or for a sampling of the LEDs and attempting to mathematically predict the adjustments necessary to produce consistent light output. The present subject matter uses an optical sensor that mimics the human eye from color and intensity perspectives. In order to be effective, though, the sensor must have a representative sample of the light output of the entire direct view LED array. Thus, a method is required of evenly collecting the light output to provide the sensor with an evenly mixed sample. The present subject matter diverts a light sample from the LED array, and mixes the light sample before sensing the mixed light sample. This sensed sample is used by a control system as feedback to control the LED array.

Figure 1A:
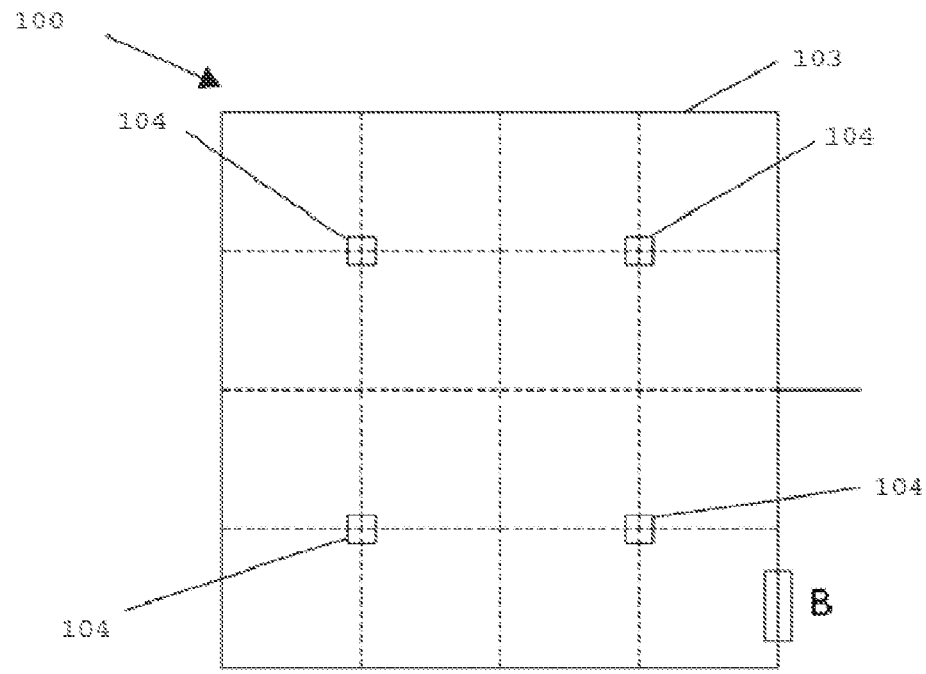
FIGS. 1A and 1B illustrate an embodiment of an optical system designed to provide a sensor with an accurate sample of the light output of the entire array of LEDs, effectively accounting for inherent LED variability.
Figure 1B:
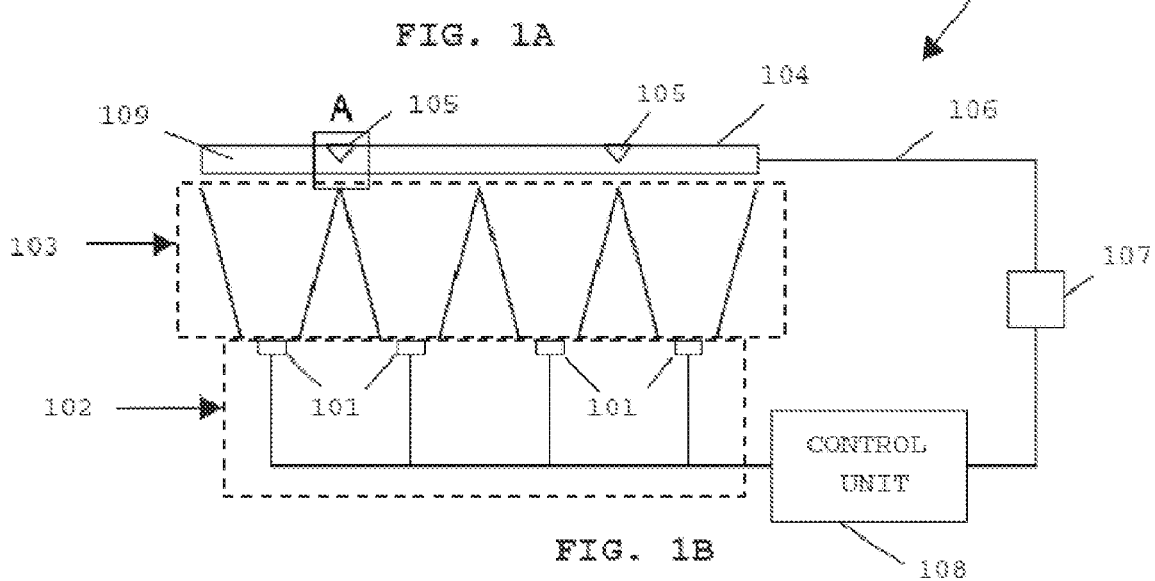

FIGS. 1A and 1B illustrate an embodiment of an optical system 100 designed to provide a sensor with an accurate sample of the light output of the entire array of LEDs, effectively accounting for inherent LED variability. With reference to FIG. 1B, the illustrated optical system 100 includes a plurality of LEDs 101, arranged as an LED array 102. The illustrated system 100 further includes optics 103, a flat optical plate 104 with engineered scattering features 105, an optical fiber 106, an optical sensor 107, and a control unit 108. FIG. 1A illustrates a plan view of the system 100, showing the optical plate 104.

Light from the LEDs 101 is directed through the optics 103 and a substantial portion of the light passes through the flat optical plate 104. The optical plate 104 can be made of a molded or textured optical material such as glass or plastic, or a flat plate with an engineered scattering material laminated to it. The scattering features 206 function to divert some of the light directed toward the optical plate 104. This diverted light provides sampled light. The optical plate 104 is designed to function as a light mixing cavity for the sampled light. For example, in various embodiments, the edges of optical plate 104 are mirrored with a specular reflector, diffuse reflector, or a combination of the two, which, in conjunction with total internal reflection on the top and bottom surfaces, captures the light in a dielectric cavity 109, which functions as the light mixing cavity.

Figure 2A:
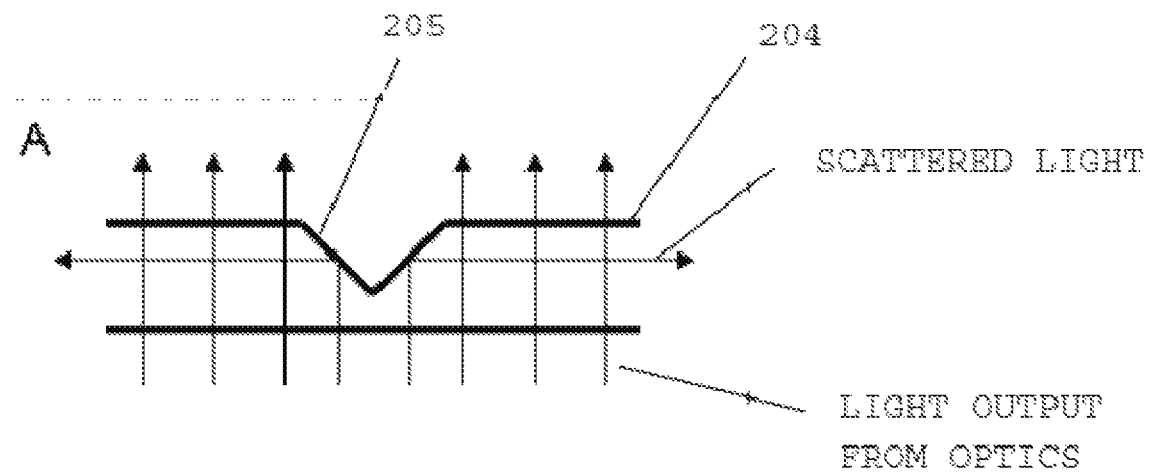
FIG. 2A illustrates an inverted V-shaped embodiment of a scattering feature.
Figure 2B:
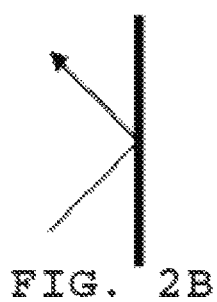
FIGS. 2B and 2C illustrate specular and diffuse reflection, respectively, which may be used in the walls of the optical plate to provide a light mixing chamber according to various embodiments of the present subject matter.
Figure 2C:
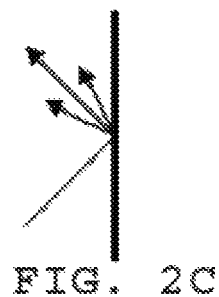

FIGS. 2B and 2C illustrate specular and diffuse reflection, respectively. Specular reflection is the mirror-like reflection of light, where light from a single incoming direction is reflected into a single outgoing direction. Diffuse reflection reflects incoming light in a broad range of directions.

The mixing chamber walls that provide specular and/or diffuse reflection, along with the specifically engineered scattering features 105 such as an inverted pyramid, allows the system to evenly sample the light over the entire plane. The scattering features 105 change the direction of the sampled light from a perpendicular or near perpendicular direction with respect to the optical plate 104 to another direction that allows the light to reflect off of the interior walls of the optical plate and mix within the cavity. FIG. 2A, for example, illustrates an inverted V-shaped scattering feature 205, and further illustrates that the light output from the optics enters the optical plate 204 in a nearly perpendicular direction with respect to the walls of the optical plate, and the scattered light is reflected. The illustrated scattered light is in a parallel or nearly parallel direction with respect to the walls of the optical plate 204; but a parallel direction is not required. Rather, the reflected light should be within the critical angle to reflect off of the walls of the optical plate and mix in the mixing chamber. The light samples diverted by the scattering feature substantially overlap within the cavity because of the significant number of reflections, which results in homogenous chromaticity and intensity.

The optical plate 104 has a gap or hole along one edge to accommodate optical fiber 106, which forwards a sample of the light to sensor 107. A columnating optic, such as a lens, can be used between optical fiber 106 and optical sensor 107 to control the angle of incidence of the sampled light on the sensor.

The sensed, sampled light taken from the mixing chamber can be analyzed by the control unit 108 using a number of algorithms. For example, algorithms, such as those disclosed in U.S. Published Application 20110012512 (application Ser. No. 12/618,394), filed on Nov. 13, 2009, entitled "Solid State Light Fixture With Enhanced Thermal Cooling and Color Mixture" and/or those disclosed in U.S. Published Application 2007/0103646 (application Ser. No. 11/557,861), now issued as U.S. Pat. No. 7,859,554, filed Nov. 8, 2006 and entitled "Apparatus, Methods, and Systems for Multi-Primary Display or Projection" could be used in the control unit 108 to take measurements from a color sensor 107 and adjust the LEDs 101 to produce the desired result. U.S. Published Applications 20110012512 and 2007/0103646 are incorporated by reference in their entirety.

The light output from the entire direct view array 102 of LEDs 101 can be sampled, and the sampled light can be thoroughly mixed in the optical plate 104 before the mixed light enters the sensor 107, enabling the overall optical feedback system to accurately and precisely adjust the light output to provide consistent color quality over time. The control system may sample the light during normal operation or may sample the light during test routines. For example, some test routines measure the output for all of the LEDs. Some test routines measure the output for a subset of LEDs in the LED array. For example, the LED array may be categorized by nominal colors, and some embodiments may test each color produced by the LED array at a time.

Figure 3:
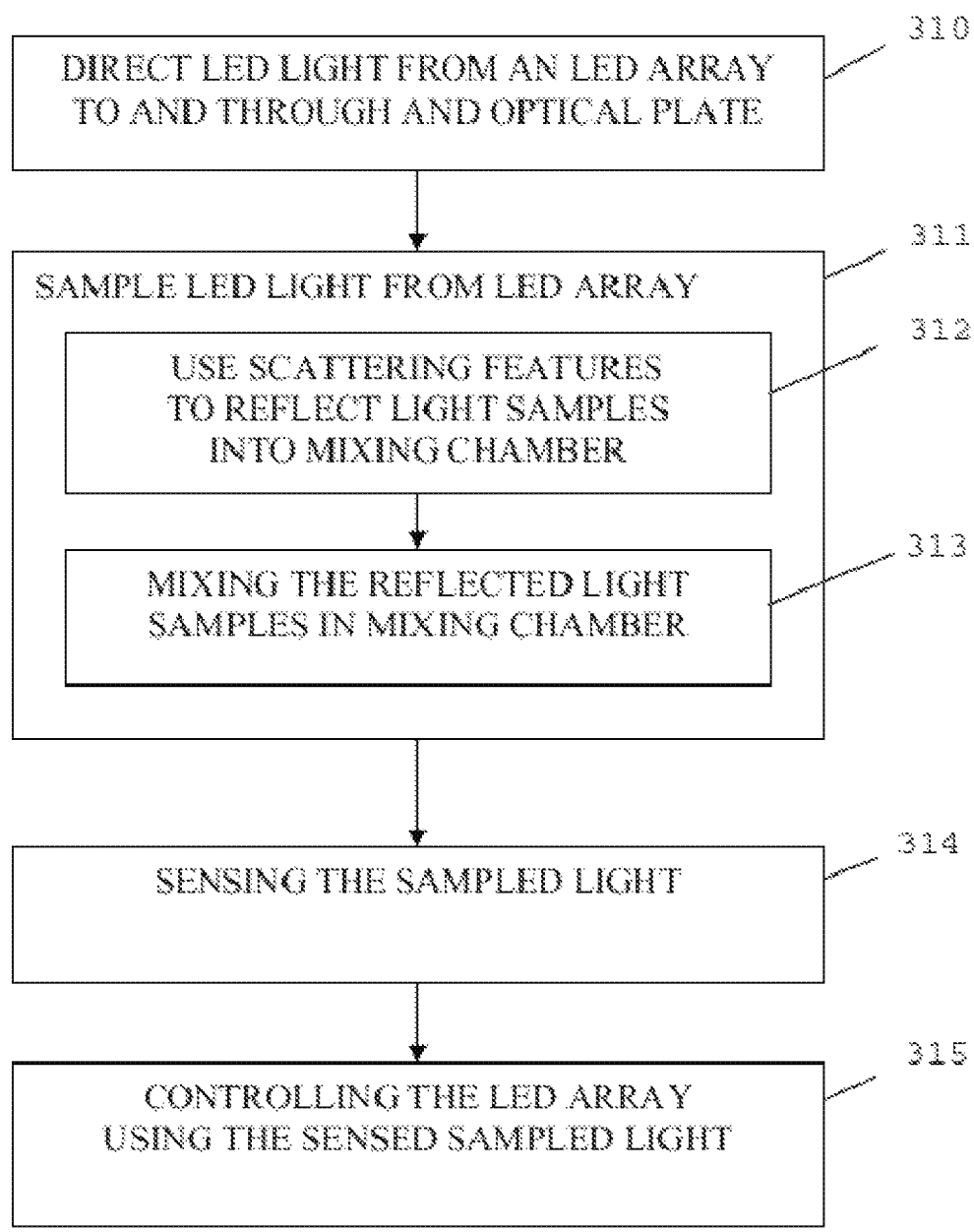
FIG. 3 illustrates a method according to various embodiments of the present subject matter.

FIG. 3 illustrates a method according to various embodiments of the present subject matter. The method is performed using an array of LEDs, an optical plane with a mixing chamber and scattering features, and a light sensor. At 310, LED light is directed from an LED array to and through the optical plate. At 311, this LED light from the LED is sampled. More specifically, at 312 scattering features are used to reflect light samples into the mixing chamber, and at 313 the reflected light samples are mixed in the mixing chamber. The sampled light sensed by a light sensor at 314, and the LED array is controlled using the sensed sampled light at 315.

Lighting System

Figure 4:
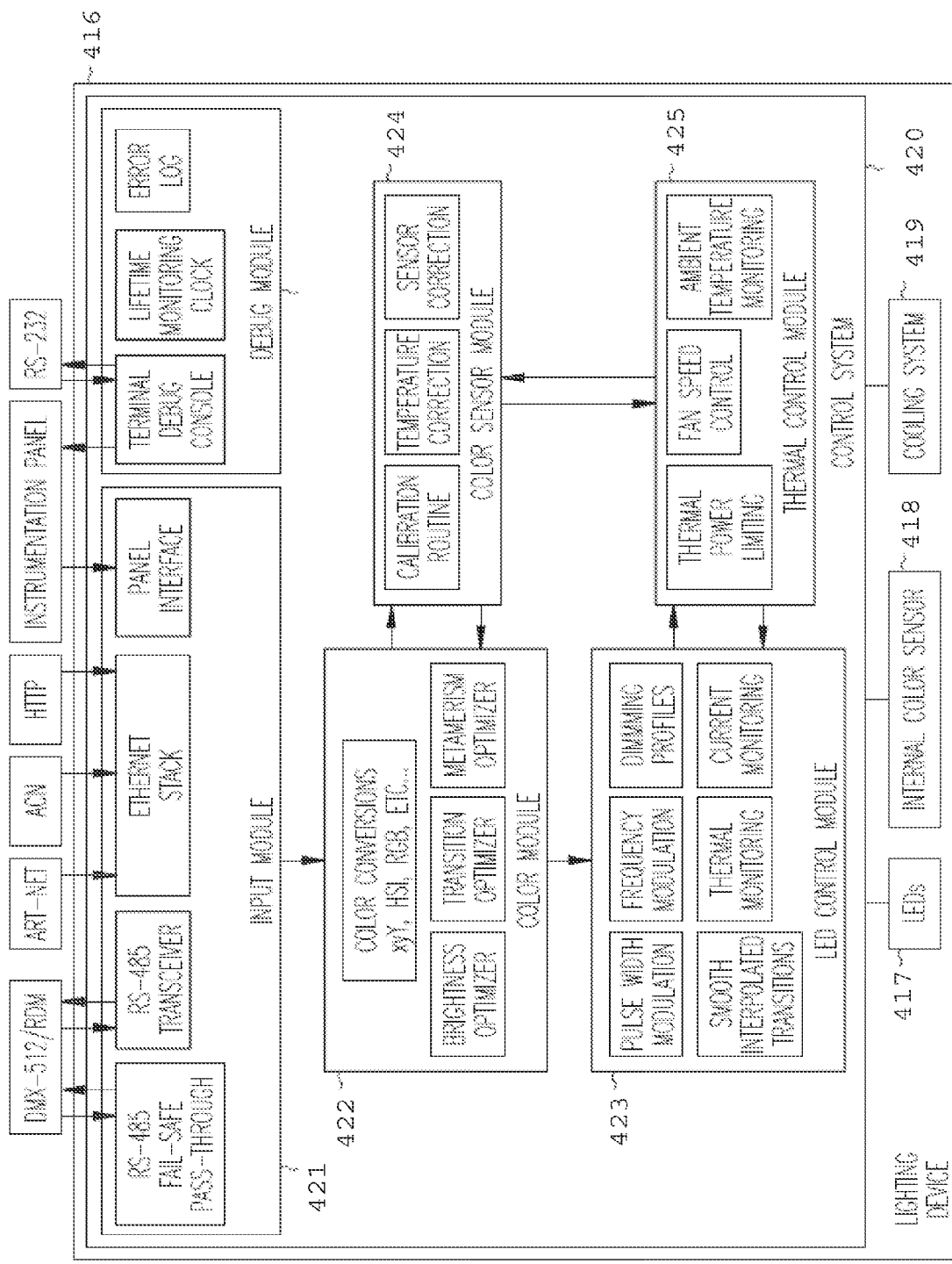
FIG. 4 illustrates an LED lighting system that provides optical feedback used for color correction, according to various embodiments of the present subject matter.

FIG. 4 illustrates an LED lighting system that provides optical feedback used for color correction, according to various embodiments of the present subject matter. The sampling optic discussed above can be used to provide the optical feedback for the illustrated system.

The illustrated system includes a lighting device 416 with LEDs 417, an internal color sensor 418, a cooling system 419, and a control system 420. The illustrated control system includes an input module 421, a color module 422, an LED control module 423, a color sensor module 424, and a thermal control module 425. These modules may be implemented in hardware, software, firmware, or various combinations thereof.

The input module 421 receives commands from a number of input sources. For example, USITT DMX512-A data can be received over an EIA-485 connection and used to change the output color. Data may also be received through RDM as specified by ESTA E1.20, Artistic License's Art-Net, ACN as specified by ANSI E1.17, or standard HTTP through a web browser. The input module 929 maintains a configuration file, which defines how incoming data is processed. In the case of USITT DMX512-A data, the configuration file specifies the starting address, how many channels are received, and how those channels are processed.

The internal configuration file may be updated in a number of ways. RDM, ACN, and Art-Net all contain provisions in their protocols for changing how incoming data is processed. The input module 421 receives these commands and updates the configuration file so that data is processed correctly. A configuration webpage hosted by the input module 421 is another potential method of changing the configuration file. Additionally, some form of external instrumentation panel may be used to set configuration settings. The instrumentation panel may be as simple as DIP switches used to set the starting address, or something more advanced like an LCD display which can be used to configure every detail of the data processing.

When the input module 421, receives data it sends that data to the appropriate color conversion procedure. The data may have been sent as hue and saturation values, as CIE 1931 xy-coordinates, as Adobe 1998 RGB, as sRGB, as a color temperature of white, or as any other color space. The color module 422 converts the data into a standard color space so that the color can be further processed. The color module 422 then uses the chromaticity and relative intensity of the color sources to determine what ratios of the color sources will produce the desired color. When using more the three color sources there are multiple ways to produce the desired color. The color module 422 can have multiple algorithms available, which enable it to optimize the color source ratios to maximize for brightness, smooth transitions, minimum observer metamerism, or maximize color rendering. Which algorithm to use may be specified by the configuration file or selected automatically based on the color that is being made.

When the color module 422 determines what ratio of color sources will produce the desired color it sends this information to the LED control module 423. To create a smooth transition the LED control module 423 interpolates linearly from the previous ratio of color sources to the new ratio. An overall intensity value is also passed in from the color module 422. This overall intensity value transitions linearly with color ratios. However, a change in lumen output does not relate linearly to the human perception of brightness. So the LED control module 423 uses a dimming profile to try to map the overall intensity value to a perceived brightness level. The LED control module 423 may contain many dimming profiles which can be selected between by the configuration file. For example, one dimming profile might map each intensity value to the square of that intensity value, while another may use the cube.

At each transition step the dimming profile is applied to the intensity value. The result is the used to scale the ratio of color sources. These new values are then output by setting the pulse lengths for each LED color source. In addition to using pulse width modulation to change the intensity, the frequency may be modulated at the same time. The frequency may be decreased to increase the resolution of LED color source settings, or it may be increased to reduce the perception of flicker. This change in frequency may be automatically calculated based on the output pulse lengths, or it may be selected by the input data from the input module 421.

The LED control module 423 may also measure the current drawn from the LEDs, the temperature of the LEDs, or the temperatures of the power regulation circuitry for the LEDs. This information is communicated to the thermal control module 425. The thermal control module 425 looks at previous temperatures and determines if the LEDs are getting too hot. If so it may reduce the maximum output power. If this is the case the LED control module 423 will scale down the overall intensity until the power consumption is limited to the new maximum output power.

The color sensor module 424 can measure chromaticity and intensity of the LED color sources. The color sensor module 424 may consist solely of a calibration routine that is run at startup or on command from the user. In this embodiment the calibration routine is used to correct for the slow change in chromaticity or intensity that occurs over the lifetime of LED color sources. If the color sensor module 424 is capable of real-time, continuous sampling the sensor data from sensor 418 can be used to correct for the changes chromaticity and intensity that occur with changes in LED temperature. Whether samples are taken continuously or not, the color sensor module 424 performs a similar task. After taking samples of each LED color source, a factory-programmed sensor correction is applied to the measurements. These new measurements are then sent to the color module 422 and used to process the next color to be created.

Some embodiments include the thermal control module 425 to manage the system temperature. The thermal control module 425 measures ambient temperature, fan speed, and communicates with the LED control module 423 to determine the temperature of the LEDs. By monitoring this information the thermal control module 425 will increase or decrease the fan speed to keep the temperature from exceeding a maximum safe operating temperature while keeping the fan as quiet as possible. If the temperature is still climbing after setting the fan to maximum speed, the thermal control module 425 will communicate with the LED control module 423 to limit the maximum output power.

The above detailed description is intended to be illustrative, and not restrictive. The scope of the invention should, therefore, be determined with reference to the appended claims, along with the full scope of equivalents to which such claims are legally entitled.

What is claimed is:

1. A method, comprising:
   producing light from an LED array, wherein the LED array includes a plurality of LEDs;
   directing the light from the LED array to an optical plate, wherein a substantial portion of the light directed to the optical plate passes through the optical plate;
   sampling a portion of the light from the LED array, wherein sampling includes reflecting the sampled portion of the light into a mixing chamber, and mixing the sampled portion of the light within the mixing chamber, the optical plate having a cavity designed to function as the mixing chamber for the sampled portion of the light, wherein reflecting the sampled portion of the light includes using scattering features in the optical plate to reflect the sampled portion of the light into the mixing chamber; and sensing the mixed, sampled portion of the light.

2. The method of claim 1, further comprising controlling the LED array using the sensed light.

3. The method of claim 2, wherein controlling the LED array includes individually controlling the intensity of individual LEDs in the LED array using the sensed light.

4. The method of claim 2, wherein controlling the LED array includes controlling the chromaticity of the light produced by the LEDs using the sensed light.

5. The method of claim 1, wherein mixing the light within the mixing chamber includes reflecting the light off of specular surfaces and diffuse surfaces of the mixing chamber.

6. The method of claim 1, wherein mixing the light within the mixing chamber includes reflecting the light off of specular surfaces of the mixing chamber.

7. The method of claim 1, wherein mixing the light within the mixing chamber includes reflecting the light off of diffuse surfaces of the mixing chamber.

8. A system, comprising:
an LED array configured to generate LED light;
an optical plane with a plurality of scattering features and with a mixing chamber;
optics configured to direct the LED light to the optical plane, wherein a substantial portion of the LED light passes through the optical plane, wherein the plurality of scattering features are configured to reflect a sampled portion of the LED light into the mixing chamber and wherein the mixing chamber is configured to mix the sampled portion of the LED light;
a sensor configured to sense the sampled portion of the LED light received from the mixing chamber; and
a controller connected to the sensor and configured to control the LED array using the sensed, sampled portion of the LED light received from the mixing chamber,
wherein the controller is configured to perform a testing routine to produce test light, wherein the scattering features are configured to reflect a sampled portion of the test light into the mixing chamber, the mixing chamber is configured to mix the sampled portion of the test light, the sensor is configured to sense the sampled portion of the test light, and the controller is configured to control the LED array using the sensed, sampled portion of the test light.

9. The system of claim 8, wherein the controller is configured to perform a testing routine where LEDs in individual subsets of the LED array produce the test light.

10. The system of claim 8, wherein the mixing chamber includes walls with specular reflection.

11. The system of claim 8, wherein the mixing chamber includes walls with diffuse reflection.

12. The system of claim 8, wherein the mixing chamber includes walls with both specular reflection and diffuse reflection.

13. The system of claim 8, wherein the controller is configured to perform a testing routine where all of the LEDs in the LED array produce the test light.

14. The system of claim 9, wherein the each individual subset of the LED array is a nominal color for LEDS in the LED array.

15. A system, comprising:
an LED array configured to generate LED light, wherein the LED array includes a plurality of LEDs;
an optical plane with a plurality of scattering features and with a mixing chamber;
optics configured to direct the LED light to the optical plane, wherein a substantial portion of the LED light passes through the optical plane, wherein the plurality of scattering features are configured to reflect a sampled portion of the LED light into the mixing chamber and wherein the mixing chamber is configured to mix the sampled portion of the LED light;
a sensor configured to sense the sampled portion of the LED light received from the mixing chamber; and
a controller connected to the sensor and configured to control the LED array using the sensed, sampled portion of the LED light received from the mixing chamber, the controller including:
a color module configured to receive data and convert the received data into a color space and determine an appropriate solution for producing a desired color using the LED array;
an LED control module configured to use the solution from the color module to control the plurality of LEDs in the LED array to produce the desired color; and
a color sensor module configured to measure chromaticity and intensity of the LED light, apply a sensor correction to measurements to create new measurements, and send the new measurements to the color module for use in determining subsequent solutions.

16. The system of claim 15, wherein the mixing chamber includes walls with specular reflection or diffuse reflection.

17. The system of claim 15, further comprising a cooling system configured to cool the light device, wherein the controller further includes a thermal control module configured to management temperature of the system.

18. The system of claim 15, wherein the color sensor module is configured to correct for LED temperature.

19. The system of claim 15, wherein the controller is configured to perform a testing routine where all of the LEDs in the LED array produce test light, wherein the scattering features are configured to reflect a sampled portion of the test light, the mixing chamber is configured to mix the sampled portion of the test light, and the sensor is configured to sense the sampled portion of the test light, and the controller is configured to control the LED array using the sensed, sampled portion of the test light.

20. The system of claim 15, wherein the controller is configured to perform a testing routine where LEDs in individual subsets of the LED array produce test light, wherein the scattering features are configured to reflect a sampled portion of the test light, the mixing chamber is configured to mix the sampled portion of the test light, and the sensor is configured to sense the sampled portion of the test light, and the controller is configured to control the LED array using the sensed, sampled portion of the test light.

* * * * *